US012643215B2

(12) United States Patent
Klubertanz

(10) Patent No.: US 12,643,215 B2
(45) Date of Patent: Jun. 2, 2026

(54) POWER TOOLS WITH IMPROVED COOLING

(71) Applicant: MILWAUKEE ELECTRIC TOOL CORPORATION, Brookfield, WI (US)

(72) Inventor: Jay M. Klubertanz, Hartford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/013,490

(22) Filed: Jan. 8, 2025

(65) Prior Publication Data

US 2025/0222582 A1 Jul. 10, 2025

Related U.S. Application Data

(60) Provisional application No. 63/568,551, filed on Mar. 22, 2024, provisional application No. 63/619,170, filed on Jan. 9, 2024.

(51) Int. Cl.
*B25F 5/00* (2006.01)
*B25F 5/02* (2006.01)

(52) U.S. Cl.
CPC .............. *B25F 5/008* (2013.01); *B25F 5/001* (2013.01); *B25F 5/02* (2013.01)

(58) Field of Classification Search
CPC ............. B25F 5/001; B25F 5/02; B25F 5/008
See application file for complete search history.

(56) References Cited

U.S. PATENT DOCUMENTS

2008/0110333 A1* 5/2008 Adams ...................... B25C 1/08 92/169.1

FOREIGN PATENT DOCUMENTS

| | | | | |
|---|---|---|---|---|
| DE | 202010007114 U1 * | 11/2010 | .............. | B25F 5/008 |
| GB | 2630181 A * | 11/2024 | .............. | B25F 5/006 |
| WO | WO-2008000544 A1 * | 1/2008 | .............. | B25F 5/008 |

* cited by examiner

*Primary Examiner* — Eyamindae C Jallow
(74) *Attorney, Agent, or Firm* — Michael Best & Friedrich LLP

(57) ABSTRACT

A power tool including: a housing including a motor housing portion and a handle portion; a drive mechanism supported within the housing, the drive mechanism including an electric motor and a transmission coupled to an output shaft; an electronic component configured to provide power to the electric motor; a plurality of walls disposed within the housing, the plurality of walls including a venturi wall section having a first wall portion, a second wall portion, and a constricted wall portion extending between the first wall portion and the second wall portion; and wherein the constricted wall portion includes a constricted wall diameter less than a first wall diameter of the first wall portion and a second wall diameter of the second wall portion.

20 Claims, 8 Drawing Sheets

POWER TOOLS WITH IMPROVED COOLING

CROSS-REFERENCE TO RELATED APPLICATIONS

This application claims priority to U.S. Provisional Patent Application No. 63/568,551, filed on Mar. 22, 2024, and U.S. Provisional Patent Application No. 63/619,170, filed on Jan. 9, 2024, the entire contents of each of which are incorporated herein by reference.

BACKGROUND

The present disclosure relates to power tools, and more specifically, cooling mechanisms for power tools.

SUMMARY

The present disclosure relates to power tools, and more specifically, cooling mechanisms for power tools.

In some aspects, the techniques described herein relate to a power tool including: a housing including a motor housing portion and a handle portion; a drive mechanism supported within the housing, the drive mechanism including an electric motor and a transmission coupled to an output shaft; an electronic component configured to provide power to the electric motor; a plurality of walls disposed within the housing, the plurality of walls including a venturi wall section having a first wall portion, a second wall portion, and a constricted wall portion extending between the first wall portion and the second wall portion; and wherein the constricted wall portion includes a constricted wall diameter less than a first wall diameter of the first wall portion and a second wall diameter of the second wall portion.

In some aspects, the techniques described herein relate to a power tool including: a housing including a motor housing portion and a handle portion; a drive mechanism supported within the housing, the drive mechanism including an electric motor and a transmission coupled to an output shaft; and an electronic component configured to provide power to the electric motor; a plurality of walls disposed within the housing, the plurality of walls including a venturi wall section configured to guide exhaust air from the motor to the electronic component to cool the electronic component.

In some aspects, the techniques described herein relate to a power tool including: a housing including a motor housing portion and a handle portion; a drive mechanism supported within the housing, the drive mechanism including an electric motor and a transmission coupled to an output shaft; and an electronic component configured to provide power to the electric motor; a plurality of walls disposed within the housing, the plurality of walls including a venturi wall section having a first wall portion, a second wall portion, and a constricted wall portion extending between the first wall portion and the second wall portion; wherein the first wall portion spans a gap between the motor and the transmission; wherein the venturi wall section is configured to guide exhaust air from the motor to the electronics to cool the electronics.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Described herein is a power tool with an improved cooling effect to cool the electronics onboard the power tool. The power tool comprises a housing, a motor, a plurality of walls, and electronics. The motor transmits torque that is imparted onto a workpiece via a chuck holding a tool bit. The plurality of walls can be formed within the housing and extend from the motor to the electronics. The plurality of walls further comprises a venturi wall including a constricted wall portion to provide the cooling effect.

As described in more detail below, exhaust air is taken from the motor, forced through the venturi wall (e.g., constricted wall portion), and imparted onto the electronics. The venturi wall cools the exhaust air produced from the motor. In one example, the venturi wall allows for approximately a 3 to 5 psi drop in pressure thereby providing a 2 to 5 degree drop in temperature when air is forced through the venturi wall. The venturi wall provides an improved cooling effect to the electronics onboard the power tool compared to power tools devoid of the venturi wall.

Figure 1:
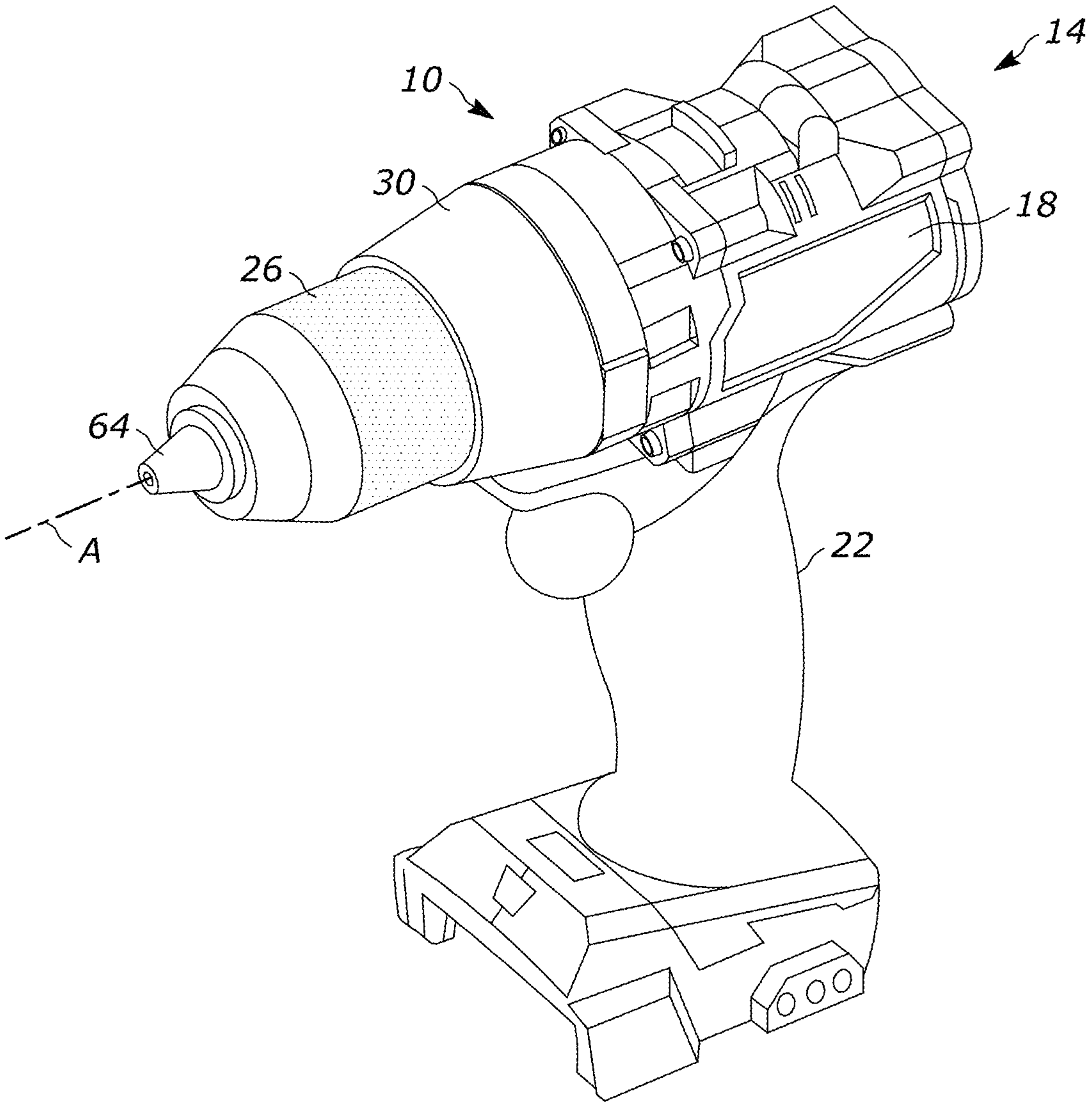
FIG. 1 illustrates a perspective view of a power tool.

Referring to the drawings, FIG. 1 illustrates a power tool 10, such as a drill or hammer drill. The power tool 10 comprises a housing 14 including a motor portion 18 and a handle portion 22, a chuck 26, and a clutch ring 30. A tool bit (not shown) can be secured to the chuck 26. The tool bit and the chuck 26 co-rotate together about a rotational axis A. The power tool 10 including the tool bit is configured to interact with a workpiece.

Figure 2:
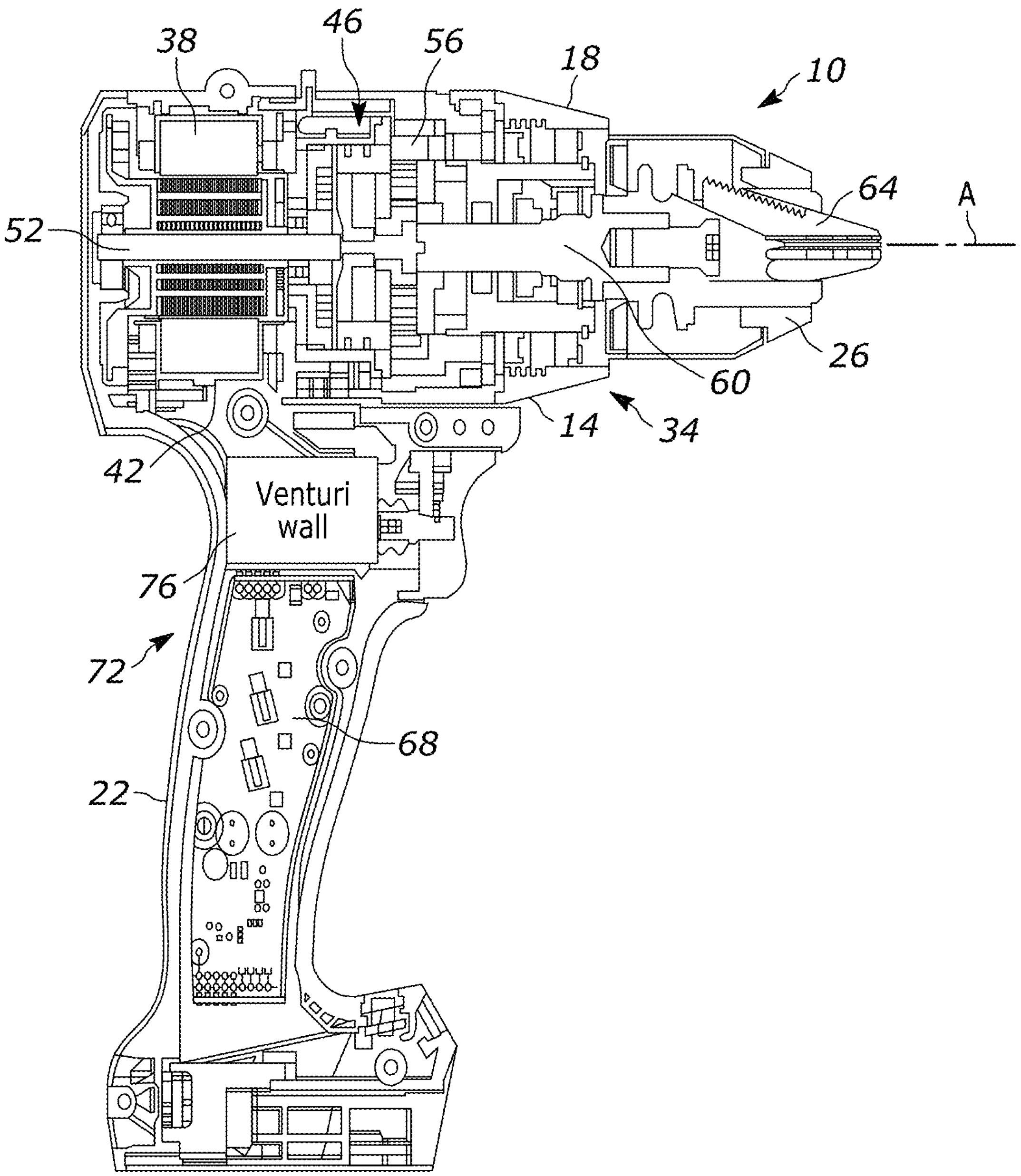
FIG. 2 illustrates a cross sectional view of the power tool of FIG. 1.

FIG. 2 illustrates the power tool 10 comprising a drive mechanism 34 including an electric motor 38 having a motor fan 42, a transmission 46, and an output shaft 60. The motor portion 38 of the housing 22 supports the electric motor 38, the transmission 46, and the output shaft 60. The transmission 46 is coupled to the output shaft 52. The transmission 46 can be a multi-speed transmission that is shiftable to provide the power tool 10 with different output speeds.

An output 56 of the transmission 46 (e.g., a last stage carrier or last stage ring gear of a multi-speed planetary transmission) can be operatively coupled to a spindle 60. The electric motor 38 can drive the spindle 60 via the transmission 46 to rotate the spindle 60 about the rotational axis A. In the illustrated embodiment, the spindle 60 and the motor output shaft 52 are coaxial with the rotational axis A.

With continued reference to FIGS. 1 and 2, the drive mechanism 34 further comprises the chuck 26 located at an end of the spindle 60 opposite the transmission 46. The chuck 26 is coupled to the spindle 60 such that the chuck 26 and spindle 60 co-rotate together. The chuck 26 includes a plurality of jaws 64 configured to support the tool bit (e.g., a drill bit, a screwdriver bit) (not shown). Torque is transmitted from the electric motor 38 through the transmission 46 and spindle 60 to the chuck 26 to be imparted on the workpiece. Power for the electric motor 38 can be drawn from an on-board power source such as a battery (not shown) removably coupled to a battery receptacle located at a bottom end of the housing. In other embodiments, the power tool 10 may be powered by a remote power source (e.g., an alternating current source) via a cord.

The power tool 10 can comprise electronics 68 disposed throughout the housing 14 of the power tool 10. The electronics 68 can be, for example, but not limited to, electronic boards, PCBs, wires, switches, terminals, sensors, LEDs, or any other suitable electronics. For example, in some embodiments, the electronics 68 may include a PCB and switching electronics, such as MOSFETs, IGBTs, or the like, for providing power distribution and control to the motor 38. The electronics 68 can be disposed in the motor portion 18 of the housing 14. Alternatively, the electronics 68 can be disposed in the handle portion 22 of the housing 14. The electronics 68 can be powered by an on-board power source such as a battery (not shown).

The housing 14 further comprises a plurality of walls 72 that allows air to flow throughout the housing 14 of the power tool 10. Specifically, the plurality of walls 72 allows air to flow from the housing motor portion 18 to the housing handle portion 22. More specifically, the plurality of walls 72 allows air to flow from the motor fan 42 to the electronics 68 disposed in the housing handle portion 22.

The plurality of walls 72 can be shaped similar to ducts or pipes disposed throughout the housing 14 of the power tool 10. The plurality of walls 72 can comprise a cross-sectional shape. The cross-sectional shape of the plurality of walls 72 can be square, rectangular, circular, or any other suitable cross-sectional shape. The plurality of walls 72 can be co molded with the housing. Specifically, the plurality of walls 72 can be co molded into the housing motor portion 18 and/or the housing handle portion 22. In other embodiments, the plurality of walls 72 can be separately formed and installed into the housing 14 of the power tool 10. For example, the plurality of walls 72 can be formed as a separate component and captured between cooperating halves of the housing handle portion 22.

Figure 3:
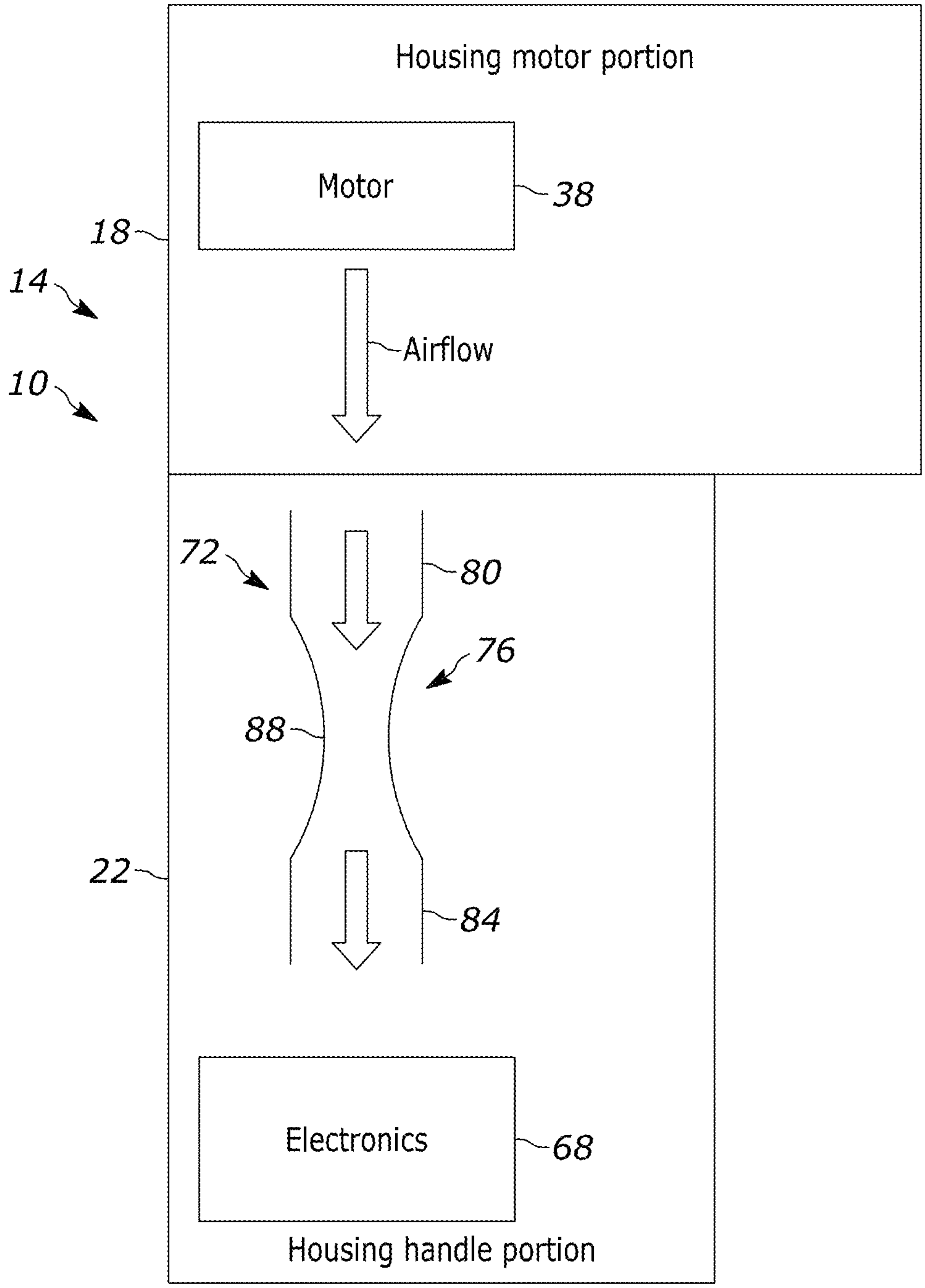
FIG. 3 illustrates a schematic view of the power tool of FIG. 1.

FIG. 3 illustrates a schematic view of the power tool 10. The plurality of walls 72 can further comprise a venturi wall section 76 defining a converging-diverging fluid flow path to provide a venturi like effect within the housing 14 of the power tool 10. The venturi effect allows for a reduction of air pressure when air flows through a constricted (or choke) section within the housing 14. Reducing air pressure can allow for a decrease in temperature of cooling air downstream of the venturi wall section 76. The venturi wall section 76 can therefore provide an enhanced cooling effect between the motor 38 and the electronics 68 disposed in the housing handle portion 22. In some embodiments, the venturi wall section 76 can be located between the motor 38 and the electronics 68 disposed in the housing handle portion 22 (FIG. 2).

With continued reference to FIG. 3, the venturi wall section 76 can comprise a first wall portion 80, a second wall portion 84, and a constricted wall portion 88 extending between the first wall portion 80 and the second wall portion 84. The first wall portion 80 can comprise a first diameter, the second wall portion 84 can comprise a second diameter, and the constricted wall portion 88 can comprise a third diameter. The first diameter and the second diameter can be the same. In other embodiments, the first diameter and the second diameter can be different. The third diameter can be less than both the first diameter and the second diameter. The third diameter of the constricted wall portion can be the choke section of the venturi effect within the power tool housing 14.

FIG. 3 illustrates an example of exhaust air flowing throughout the housing 14 of the power tool 10. In one example, exhaust air produced from the electric motor fan 42 can be channeled toward the electronics 68. The exhaust air can flow from the motor 38, through the venturi wall section 76, and to the electronics 68 disposed in the housing handle portion 22. The venturi wall section 76 can be positioned between the electric motor 38 and the electronics 68 such that the first wall portion 80 receives exhaust air produced from the electric motor 38, and the second wall portion 84 imparts air onto the electronics 68. The constricted wall portion 88 of the venturi wall section 76 constricts the exhaust air flowing in a direction from the first wall portion 80 to the second wall portion 84. Constricting the air flow via the constricted wall portion 88 allows for a reduction of air pressure. Reducing air pressure across the venturi wall section 76 allows for a decrease of air temperature. Decreasing temperature across the venturi wall section 76 is advantageous for cooling the electronics 68 onboard the power tool 10.

In one example, the venturi wall section 76 allows for approximately a 3 psi to 5 psi drop in pressure thereby providing a 2 degree to 5 degree drop in temperature when exhaust air is forced through the venturi wall section 76 (i.e., constricted wall portion 88 of the venturi wall section 76). The venturi wall section 76 provides an improved cooling effect to the electronics 68 onboard the power tool 10 compared to power tools devoid of the venturi wall section 76.

In the illustrated embodiment, air from the motor fan 42 is routed through the venturi wall section 76 to cool the electronics 68. In some embodiments, the power tool 10 may additionally or alternatively include an air pump (e.g., a reciprocating pump, a gear pump, or the like) driven by the electric motor 38 to compress air. The compressed air may then be directed through the venturi wall section 76 to cool the electronics 68 in the manner discussed above. In some embodiments, the compressed air may be accumulated in an accumulator chamber, and then periodically discharged through the venturi wall section 76 when additional cooling is needed. In some embodiments, air may be released from the accumulator chamber in response to a detected elevated temperature of the electronics 68.

FIGS. 4-8 illustrate a power tool 110 according to another embodiment. The power tool 110 of FIGS. 4-8 is similar to the power tool 10 of FIGS. 1-3. Therefore, like structure will be identified with like reference numerals plus "100".

In the embodiment of FIGS. 4-8 the power tool 110 is in the form of a rotary impact tool, and, more specifically, an impact wrench. The power tool 10 includes a housing 114 with a primary housing **114*a* and a secondary housing 114*b*. The secondary housing 114*b* (which may also be referred to as an impact case or hammer case) is coupled to the primary housing 114*a*. The illustrated primary housing 114*a* includes a handle portion 122 extending downwardly from a motor housing portion 118. In the illustrated embodiment, the handle portion 122 and the motor housing portion 118 are defined by cooperating first and second clamshell halves or housing portions. Although only the first clamshell half is shown herein, the second clamshell half is the same as the first clamshell half. The secondary housing 114***b* may be integrally formed as a single piece and coupled to the primary housing 14 by a plurality of fasteners or other suitable means.

In the illustrated embodiment, an end cap 200 is coupled to the motor housing portion 118 opposite the secondary housing 114*b*. The clamshell halves can be coupled (e.g., fastened) together at an interface or seam. In the illustrated embodiment, the end cap 200 is continuous and may be pressed or fitted over a rear end of the clamshell halves. In other words, the end cap 200 may not include two halves such that the end cap 200 may extend over the seam. The end cap 200 is coupled to the motor housing portion 118 by a plurality of fasteners. In yet other embodiments, the power tool 110 may not include a separate end cap, such that the clamshell halves instead define the rear end of the motor housing portion 118.

Figure 4:
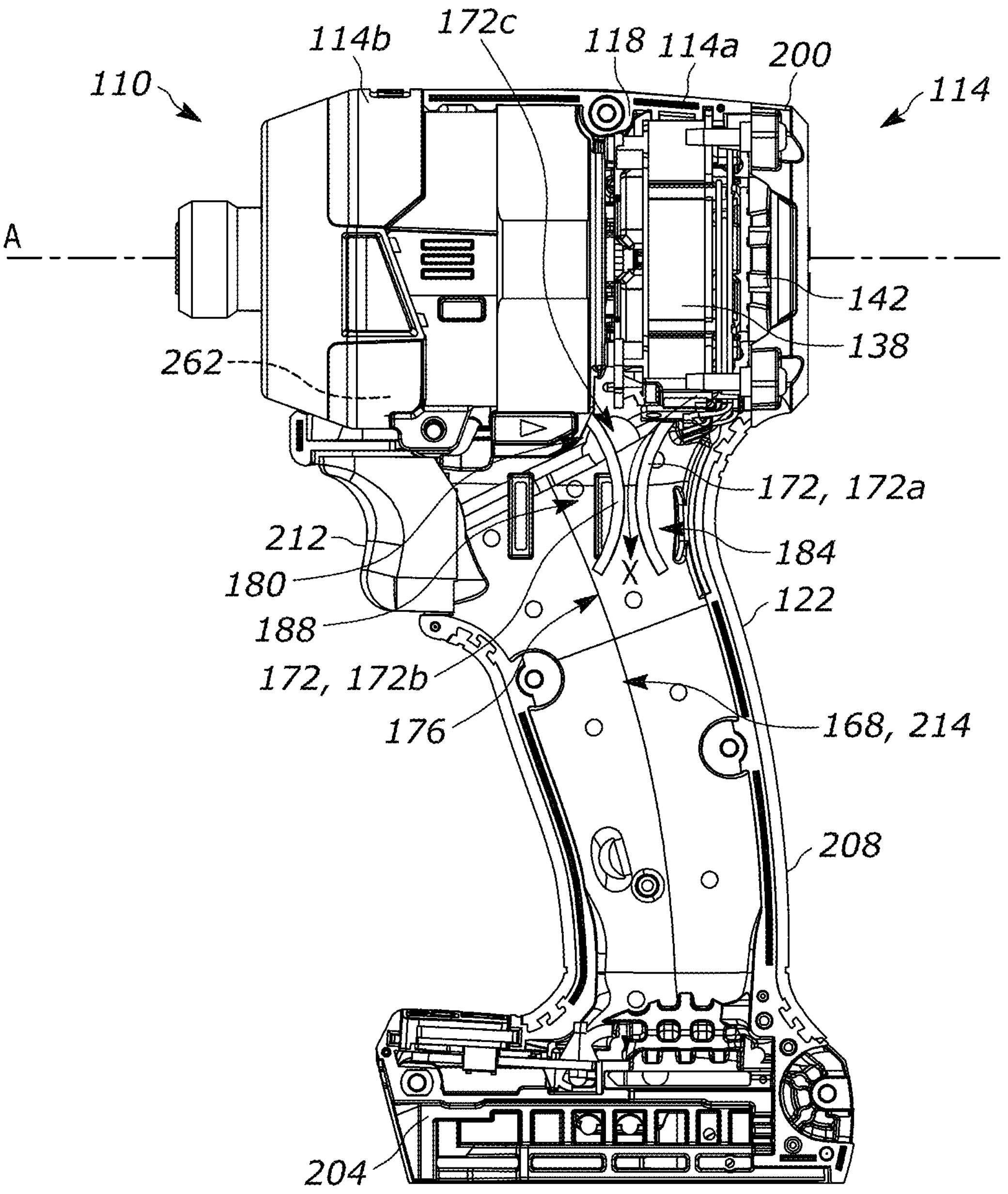
FIG. 4 illustrates a side view of a power tool with a portion of the housing removed.

Referring to FIG. 4, the handle portion 122 includes a battery pack receptacle 204 configured to electrically and mechanically coupled to a battery pack (not shown). A motor 138 is supported within the motor housing portion 118 and receives power from the battery pack via connections, pads, and/or battery terminals in the battery receptacle 204 when the battery pack is coupled to the battery receptacle 204. In the illustrated embodiment, the handle portion 122 of the clamshell halves can be covered or surrounded by a grip portion 208, which may be overmolded on the handle portion 122.

Figure 5:
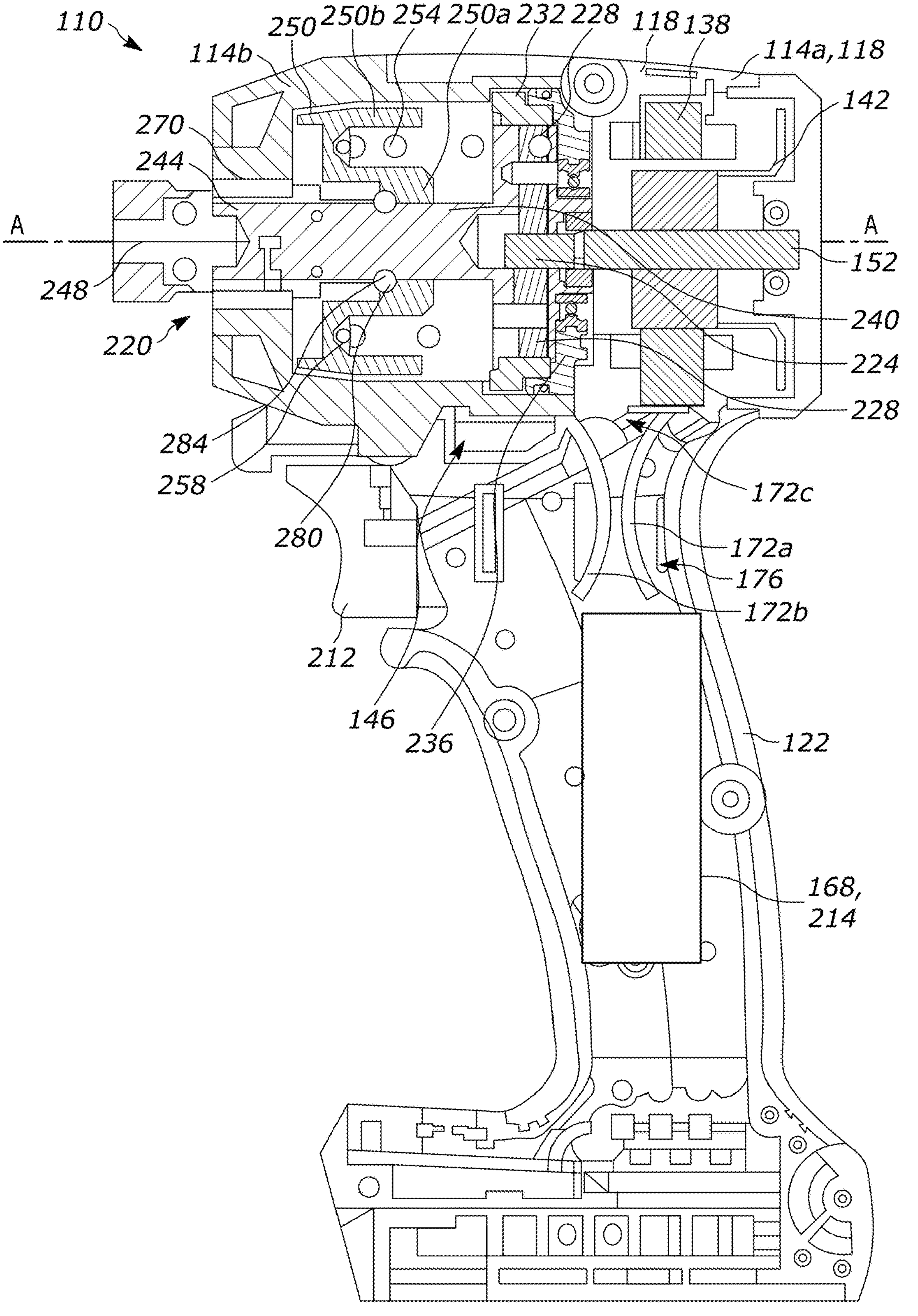
FIG. 5 illustrates a cross-sectional view of the power tool of FIG. 4 along the line 5-5 of FIG. 4.
Figure 6:
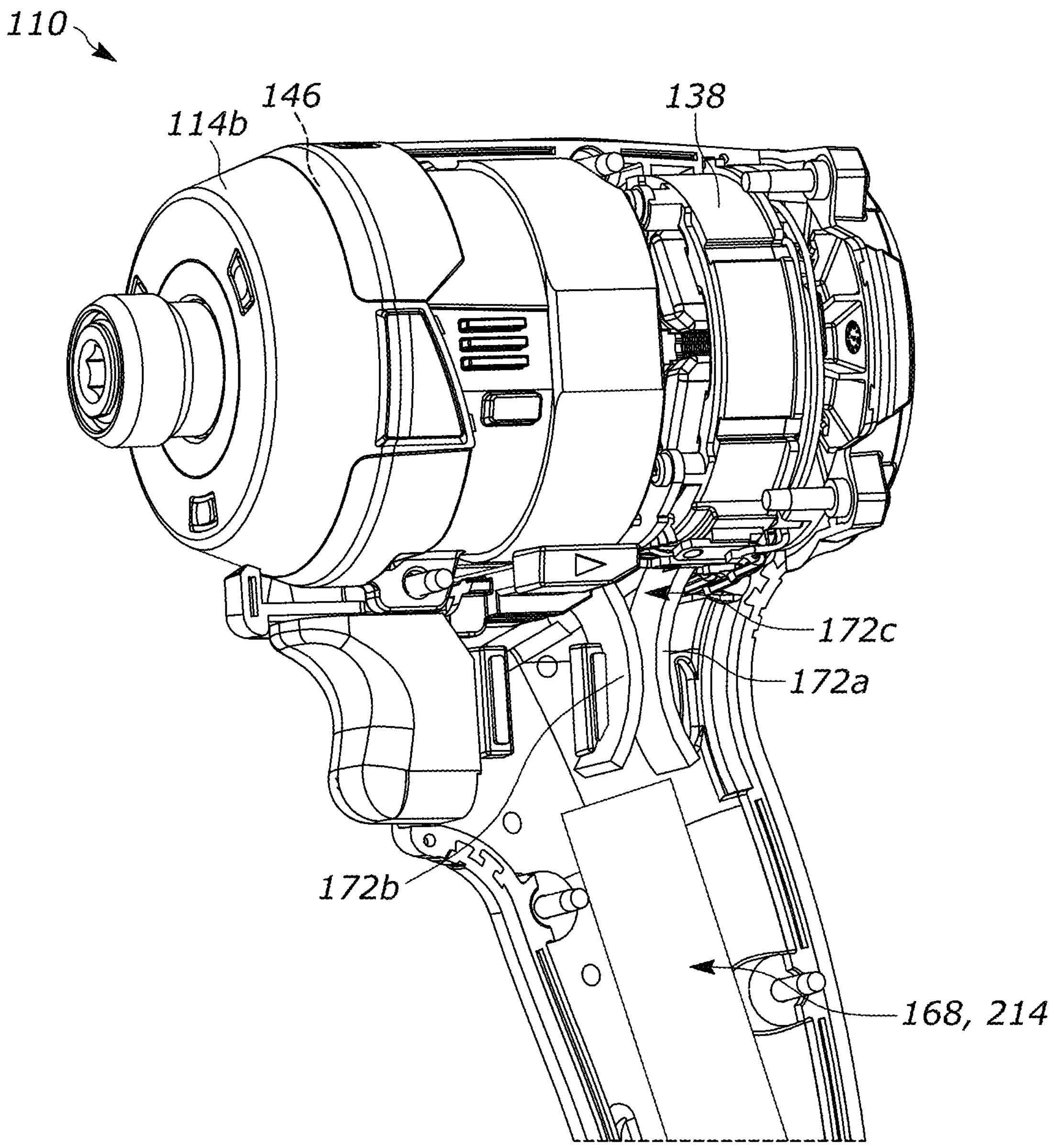
FIG. 6 illustrates a detailed perspective view of the power tool of FIG. 4 with a portion of the housing removed.
Figure 7:
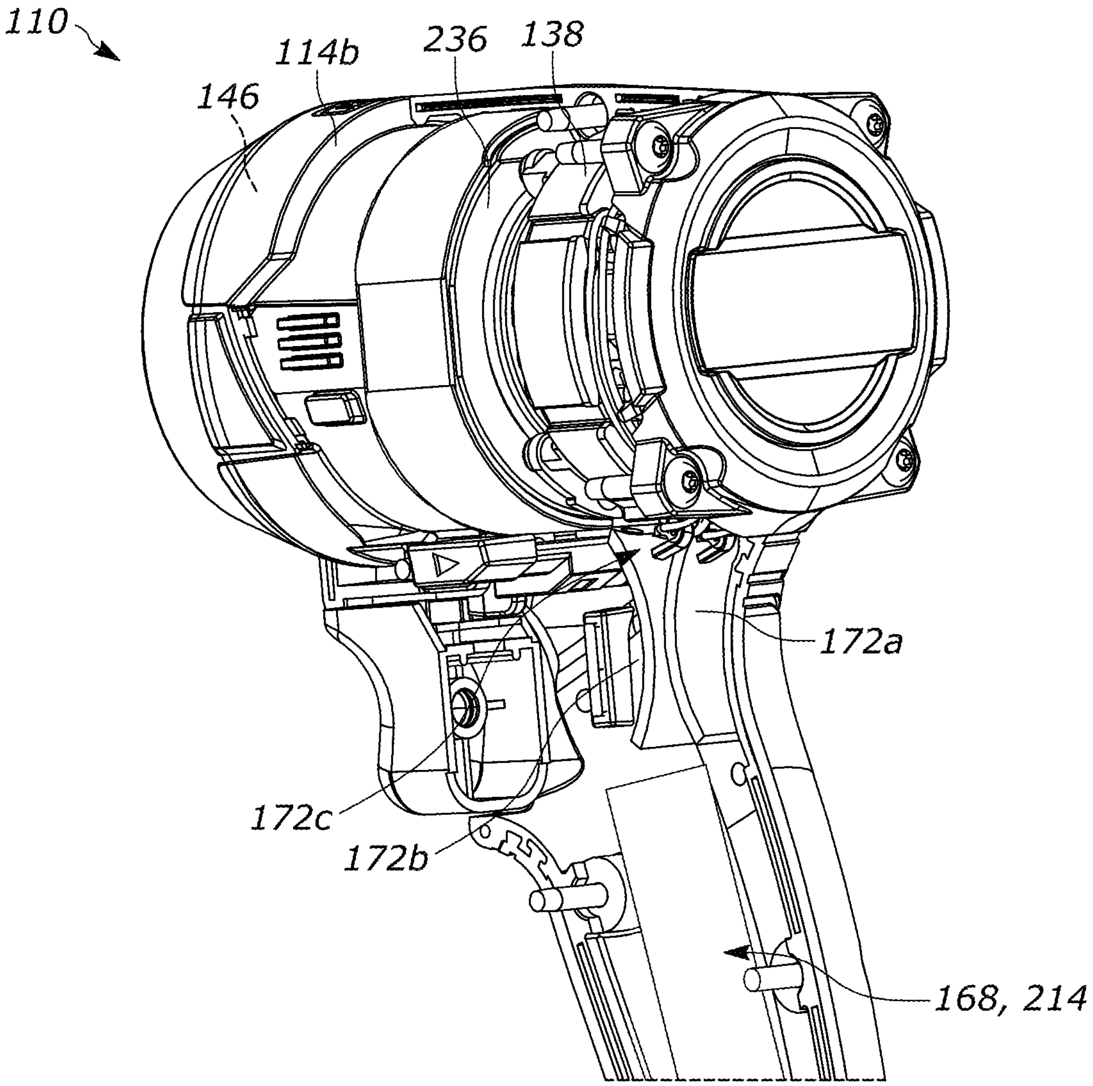
FIG. 7 illustrates another detailed perspective view of the power tool of FIG. 4 with a portion of the housing removed.
Figure 8:
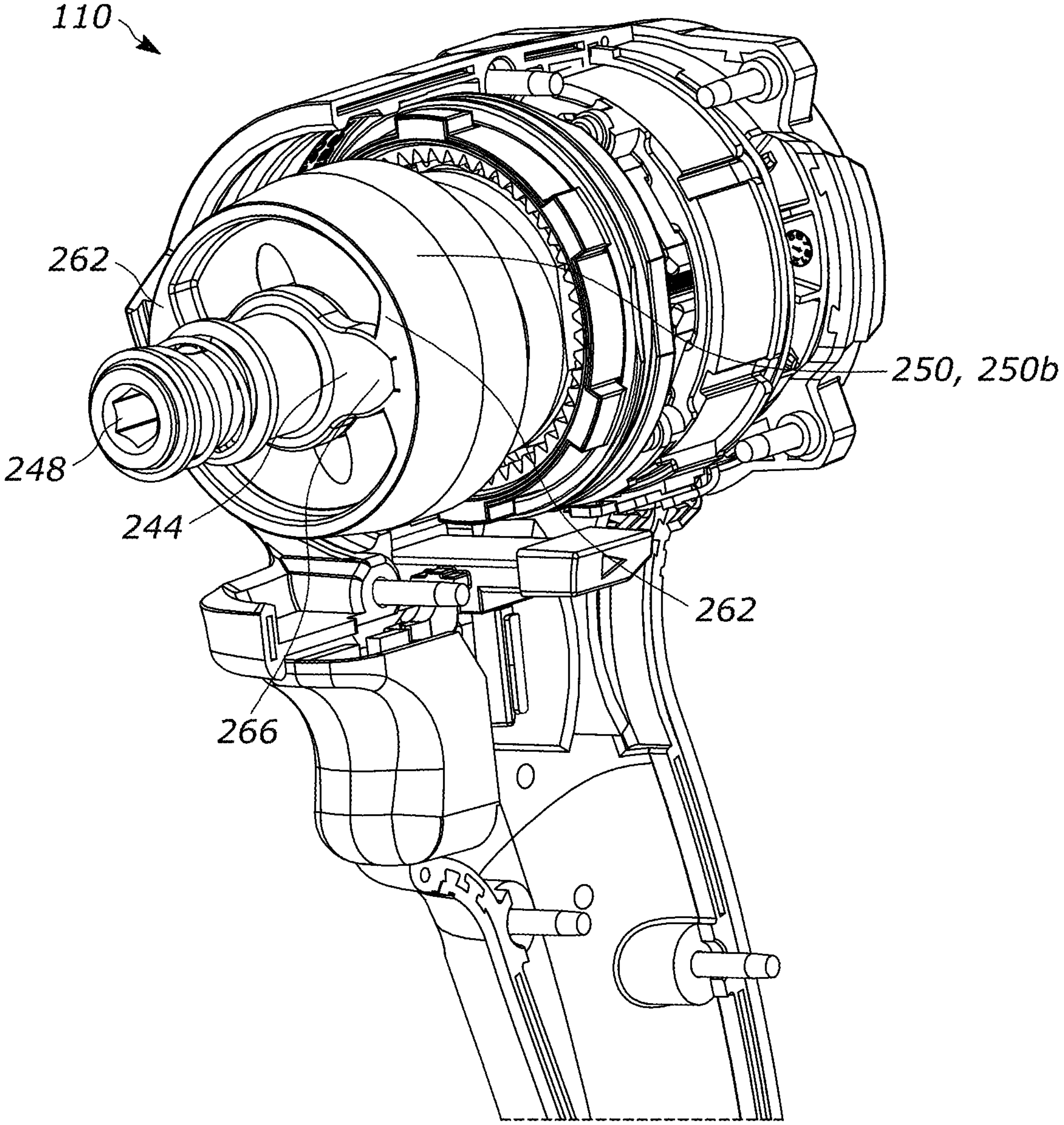
FIG. 8 illustrates another detailed perspective view of the power tool of FIG. 4, with portions removed.

With specific reference to FIG. 5, the motor 138 includes an output shaft 152 that is rotatable about an axis A. A motor fan 142 is coupled to the output shaft 152 behind the motor 138 to generate airflow for cooling the motor 138 and/or other components of the power tool 10.

With continued reference to FIGS. 4-5, the power tool 110 includes a trigger 212 (which may include an actuator and a trigger switch) supported by the primary housing 114*a* that selectively electrically connects the motor 138 via electronics 168 (e.g., via suitable control circuitry provided on one or more printed circuit board assemblies ("PCBAs")) and the battery pack to provide DC power to the motor 138. In other embodiments, the power tool 110 may include a power cord for electrically connecting the trigger 212 and the motor 138 to a source of AC power. As a further alternative, the power tool 10 may be configured to operate using a different power source (e.g., a pneumatic or hydraulic power source, etc.).

In the illustrated embodiment, there is a PCBA 214 is supported within handle portion 122 of the primary housing 114*a*. The PCBA 214 is in electrical communication with the motor 138, a switch element of the trigger 212, and terminals of the battery receptacle 204. In the illustrated embodiment, the PCBA 214 includes a plurality of semi-conductor switching elements (e.g., MOSFETs, IGBTs, or the like) that control and distribute power to windings in the stator in order to cause rotation of the rotor and output shaft 152. The PCBA 214 may also include one or more microprocessors, machine-readable, non-transitory memory elements, and other electrical or electronic elements for providing operational control to the power tool 110. In some embodiments, the motor 138 may be configured for sensorless control via the PCBA 214. In other embodiments, there may additional PCBAs positioned within the housing 114.

Referring still to FIG. 5, the illustrated power tool 110 includes a transmission 146 (e.g., a gear assembly) driven by the output shaft 152 and an impact mechanism 220 coupled to an output of the gear assembly 146. The gear assembly 146 provides a speed reduction between the output shaft 152 and an input of the impact mechanism 220. Collectively, the motor 138, the motor fan 142, the transmission 146, and the impact mechanism 220 may be considered the drive mechanism 134.

With continued reference to FIG. 5, the gear assembly 146 includes a pinion gear 224 coupled to the output shaft 152 of the motor 138, a plurality of planet gears 228 meshed with the pinion gear, and a ring gear 232 meshed with the planet gears 228 and rotationally fixed within the primary housing 14. In the illustrated embodiment embodiments, the ring gear 232 is supported by a gear case 236, which in turn may be supported by primary housing 114*a* (e.g., the clamshell halves). In other embodiments, the ring gear 232 may be directly supported by the primary housing 114 (e.g., the clamshell halves). In the illustrated embodiment, a gap or clearance exists between the transmission 146 (e.g., the gear case 236 of the transmission 146) and the motor 138.

As shown in FIG. 5, the planet gears 228 are coupled to a camshaft 240 of the impact mechanism 220 such that the camshaft 240 acts as a planet carrier. Accordingly, rotation of the output shaft 152 rotates the planet gears 228, which then advance along the inner circumference of the ring gear 232 and thereby rotates the camshaft 240. The impact mechanism 220 also includes an anvil 244 having a socket 248, extending from the secondary housing 114*b*. The socket 248 is configured to receive and couple a tool element (not shown) to the anvil 244 for performing work on a workpiece (e.g., a fastener). The impact mechanism 220 is configured to convert the constant rotational force or torque provided by the gear assembly 146 to a striking rotational force or intermittent applications of torque to the anvil 244 when the reaction torque on the anvil 244 (e.g., due to engagement between the tool element and a fastener (not shown) being worked upon) exceeds a certain threshold. In the illustrated embodiment of the power tool 110, the impact mechanism 220 includes the camshaft 240, a hammer 250 supported on and axially slidable relative to the camshaft 240, and the anvil 244. Stated another way, the hammer 250 is configured to reciprocate axially along the camshaft 240 and impart periodic rotational impacts to the anvil 244 in response to rotation of the camshaft 240.

The hammer 250 includes a first hammer portion 250*a* and a second hammer portion 250*b*. The first hammer portion 250*a* is provided, or extends, behind the second hammer portion 250*b* along an axial direction of the power tool 110, and the second hammer portion 250*b* is larger (e.g., diameter) than the first hammer portion 250*a*. The impact mechanism 220 further includes a spring 254 that biases the hammer 250 toward the front of the power tool 110. In other words, the spring 254 biases the hammer 250 in an axial direction toward the anvil 244, along the axis A. A thrust bearing 258 is positioned between the spring 254 and the hammer 250. The thrust bearing 258 allows for the spring 254 and the camshaft 240 to continue to rotate relative to the hammer 250 after each impact strike when hammer lugs 262 (FIG. 8) on the hammer 250 engage with corresponding anvil lugs 266 (FIG. 8) and rotation of the hammer 250 momentarily stops. In the illustrated embodiment, the anvil 244 is rotationally supported by a bushing 270, which is in turn supported within a projecting nose portion at the front end of the secondary housing 114*b*.

The camshaft 240 includes cam grooves 280 in which corresponding cam balls 284 are received. The cam balls 284 are in driving engagement with the hammer 250 and movement of the cam balls 284 within the cam grooves 280 allows for relative axial movement of the hammer 250 along the camshaft 240 when the hammer lugs 262 and the anvil lugs 266 are engaged and the camshaft 240 continues to rotate. The axial movement of the hammer 250 compresses the spring 254, which then releases its stored energy to propel the hammer 250 forward and rotate the hammer 250 once the hammer lugs 262 clear the anvil lugs 266.

The primary housing 114*a* includes a plurality of walls 172 (172*a*, 172*b*) that allows air to flow throughout the housing 114 of the power tool 110. As noted above, the plurality of walls 172*a*, 172*b* allows air to flow from the housing motor portion 118 to the housing handle portion 122. More specifically, the plurality of walls 172*a*, 172*b* allows air to flow from the motor fan 142 to the electronics 168 (e.g., the PCBA 214) disposed in the housing handle portion 122.

As shown in FIGS. 4-8, the plurality of walls 172*a*, 172*b* can form ducts or pipes disposed throughout the housing 114 (e.g., the primary housing 114*a*) of the power tool 110. In the illustrated embodiment, each of the clamshell halves includes a first wall 172*a* and a second wall 172*b* spaced apart from the first wall 172*a*. Each of the first and second walls 172*a*, 172*b* is formed with (or otherwise coupled to) respective clamshell half. When the clamshell halves are coupled together the first wall 172*a* of the first clamshell half abuts the first wall 172*a* (not shown) of the second clamshell half and the second wall 172*b* of the first clamshell half abuts the second wall 172*b* of the second clamshell half to form a duct 172*c* that that extends through the primary housing 114*a*. In the illustrated embodiment, the plurality of walls 172*a*, 172*b* define a generally circular cross-sectional shape. The cross-sectional shape of the plurality of walls 172 can be square, rectangular, or any other suitable cross-sectional shape in other embodiments. As noted above, the illustrated plurality of walls 172*a*, 172*b* are co molded with the primary housing 114*a*. Specifically, the plurality of walls 172*a*, 172*b* are co molded into the housing motor portion 118 and the handle portion 122. In other embodiments, the plurality of walls 172*a*, 172*b* can be separately formed and install into the housing 114 of the power tool 110. For example, the plurality of walls 172*a*, 172*b* can be formed as a separate component and captured between cooperating clamshell halves of the handle portion 122.

In the embodiment of FIGS. 4-8, the first wall 172*a* of each clamshell half is positioned generally adjacent to the motor 138 and the second wall 172*b* of each clamshell half is positioned generally adjacent to the transmission 146. Each of the walls 172*a*, 172*b* include a first end and a second end opposite the first end. The first end of each of the first walls 172*a* is positioned adjacent to motor the 138, while the first end of each of the second walls 172*b* is positioned adjacent to the motor 138. The second end 172*a*, 172*b* of each of the walls is positioned adjacent to the electronics 168. Accordingly, the duct 172*c* generally spans the gap between the transmission 146 and the motor 138 and extends between the transmission 146 and the motor 138 and the electronics 168.

The plurality of walls 172 can further comprise a venturi wall section 176 defining a converging-diverging fluid flow path to provide a venturi like effect within the housing 114 of the power tool 110. Like the venturi wall section 76 discussed with respect to FIGS. 1-3, the venturi wall section 176 can provide an enhanced cooling effect between the motor 138 and the electronics 168 disposed in the handle portion 122. In some embodiments, the venturi wall section 176 can be located between the motor 138 and the electronics 168 disposed in the housing handle portion 122.

With continued reference to FIG. 4, the venturi wall section 176 is defined by the first and second walls 172*a*, 172*b* of the clamshell halves. Moreover, the venturi wall section 176 can comprise a first wall portion 180, a second wall portion 184, and a constricted wall portion 188 extending between the first wall portion 180 and the second wall portion 184. In the illustrated embodiment, the first, second, and constricted wall portions 180, 184, 188 are formed by the first and second walls 172*a*, 172*b*. The first wall portion 180 can comprise a first diameter, the second wall portion 184 can comprise a second diameter, and the constricted wall portion 188 can comprise a third diameter. In the illustrated embodiment the first diameter and the second diameter are generally the same. In other embodiments, the first diameter and the second diameter can be different. The third diameter is less than both the first diameter and the second diameter. The third diameter of the constricted wall portion can be the choke section of the venturi effect within the power tool housing 114.

As shown, the walls 172*a*, 172*b* are generally arcuately shaped. That is, each of the first and second inner walls 172*a*, 172*b* includes a convex inner surface and a concave outer surface. Accordingly, the first ends of the walls 172*a*, 172*b* define the first wall portion 180 and are therefore spaced apart from one another by a distance (in this case the first diameter). Similarly, the second end of the walls 172, 172*b* define the second wall portion 184 and are therefore spaced apart from one another by a second distance (in this case the second diameter). The first and second distances generally decrease from the respective first and second ends towards a midpoint of the duct 172*c*, which defines the constricted wall portion and therefore a third, smallest distance (in this case the third diameter). In the illustrated embodiment, the third diameter is generally located at the midpoint, such that a distance between the first ends and the midpoint is the same as a distance between the second ends and the midpoint. In other embodiments, the third diameter may be above the midpoint or below the midpoint such that the distance between the first ends and the midpoint is different than the distance between the second ends and the midpoint. In some embodiments, the distance between the first ends and the midpoint may be greater than the distance between the second ends and the midpoint, while in other embodiments, the distance between the first ends and the midpoint may be less than the distance between the second ends and the midpoint.

FIG. 4 illustrates an example of exhaust air X flowing throughout the housing 114 of the power tool 10. As shown, exhaust air produced from the electric motor fan 142 can be channeled toward the electronics 168. The exhaust air can flow from through and/or around the motor 138, through the venturi wall section 176, and to the electronics 168 disposed in the housing handle portion 122. In this case, the venturi wall section 176 is positioned between the electric motor 138 and the electronics 168 such that the first wall portion 180 receives exhaust air produced from the electric motor 138, and the second wall portion 184 imparts air onto the electronics 168. The constricted wall portion 188 of the venturi wall section 176 constricts the exhaust air flowing in a direction from the first wall portion 180 to the second wall portion 184. Constricting the air flow via the constricted wall portion 188 allows for a reduction of air pressure. Reducing air pressure across the venturi wall section 176 allows for a decrease of air temperature. Decreasing temperature across the venturi wall section 176 is advantageous for cooling the electronics 168 onboard the power tool 110.

In this example, the venturi wall section 176 allows for approximately a 3 psi to 5 psi drop in pressure thereby providing a 2 degree to 5 degree drop in temperature when exhaust air is forced through the venturi wall section 176 (i.e., constricted wall portion 188 of the venturi wall section 176). The venturi wall section 176 provides an improved cooling effect to the electronics 168 onboard the power tool 10 compared to power tools devoid of the venturi wall section 176.

Although the disclosure has been described in detail with reference to certain preferred embodiments, variations and modifications exist within the scope and spirit of one or more independent aspects of the disclosure as described.

What is claimed is:

1. A power tool comprising:

a housing including a motor housing portion and a handle portion;

a drive mechanism supported within the housing, the drive mechanism including an electric motor and a transmission coupled to an output shaft;

an electronic component configured to provide power to the electric motor;

a plurality of walls disposed within the housing, the plurality of walls including a venturi wall section having a first wall portion, a second wall portion, and a constricted wall portion extending between the first wall portion and the second wall portion; and wherein the constricted wall portion comprises a constricted wall diameter less than a first wall diameter of the first wall portion and a second wall diameter of the second wall portion.

2. The power tool of claim 1, wherein the venturi wall is co-molded with the handle portion of the housing.

3. The power tool of claim 1, wherein the electronic component is disposed within the handle portion of the housing.

4. The power tool of claim 1, further comprising a fan driven by the electric motor, wherein the fan is configured to generate a cooling airflow through the venturi section to cool the electronic component.

5. The power tool of claim 4, wherein the venturi wall section is configured to reduce a temperature of the cooling airflow downstream of the constricted wall portion.

6. The power tool of claim 1, wherein the plurality of walls includes a first wall including a first end and a second end opposite the first end, the first end of the first wall being positioned adjacent the motor and the second end of the first wall being positioned adjacent the electronic component, and a second wall including a first end and second end opposite the first end, the first end of the second wall positioned adjacent the transmission and the second end of the second wall being positioned adjacent the electronic component.

7. The power tool of claim 6, wherein each of the first wall and the second wall is arcuately shaped.

8. The power tool of claim 6, wherein each of the first wall and the second wall includes a convex inner surface and a concave outer surface.

9. The power tool of claim 6, wherein the first wall portion is defined by the first ends of the first wall and the second wall, the second wall portion is defined by the second ends of the first wall and the second wall, and the constricted wall portion is defined between the first wall and the second wall at a location between the first ends and the second ends.

10. The power tool of claim 6, wherein the first wall portion spans a gap between the motor and the transmission.

11. A power tool comprising:

a housing including a motor housing portion and a handle portion;

a drive mechanism supported within the housing, the drive mechanism including an electric motor and a transmission coupled to an output shaft; and an electronic component configured to provide power to the electric motor;

a plurality of walls disposed within the housing, the plurality of walls including a venturi wall section configured to guide exhaust air from the motor to the electronic component to cool the electronic component, wherein the plurality of walls includes a first wall including a first end and a second end opposite the first end, the first end of the first wall being positioned adjacent the motor and the second end of the first wall being positioned adjacent the electronic component, and a second wall including a first end and second end opposite the first end, the first end of the second wall positioned adjacent the transmission and the second end of the second wall being positioned adjacent the electronic component.

12. The power tool of claim 11, wherein the plurality of walls includes a constricted wall portion extending between the first wall portion and the second wall portion, and wherein the venturi wall section is configured to reduce a temperature of the exhaust air downstream of the constricted wall portion.

13. The power tool of claim 11, wherein the venturi wall section is configured to reduce a temperature of the exhaust air downstream of the plurality of walls.

14. The power tool of claim 11, wherein each of the first wall and the second wall is arcuately shaped.

15. The power tool of claim 11, wherein each of the first wall and the second wall includes a convex inner surface and a concave outer surface.

16. The power tool of claim 11, wherein a first wall portion is defined by the first ends of the first wall and the second wall, a second wall portion is defined by the second ends of the first wall and the second wall, and a constricted wall portion is defined between the first wall and the second wall at a location between the first ends and the second ends.

17. The power tool of claim 11, wherein the first wall portion spans a gap between the motor and the transmission.

18. A power tool comprising:

a housing including a motor housing portion and a handle portion;

a drive mechanism supported within the housing, the drive mechanism including an electric motor and a transmission coupled to an output shaft; and an electronic component configured to provide power to the electric motor;

a plurality of walls disposed within the housing, the plurality of walls including a venturi wall section having a first wall portion, a second wall portion, and a constricted wall portion extending between the first wall portion and the second wall portion;

wherein the first wall portion spans a gap between the motor and the transmission;

wherein the venturi wall section is configured to guide exhaust air from the motor to the electronics to cool the electronics.

19. The power tool of claim 18, wherein the venturi wall section is configured to reduce a temperature of the exhaust air downstream of the constricted wall portion.

20. The power tool of claim 18, wherein the plurality of walls includes a first arcuately-shaped wall including a first end and a second end opposite the first end, the first end of the first arcuately-shaped wall being positioned adjacent the motor and the second end of the first wall being positioned adjacent the electronic component, and a second arcuately-shaped wall including a first end and second end opposite the first end, the first end of the second arcuately-shaped wall positioned adjacent the transmission and the second end of the second wall being positioned adjacent the electronic component.

* * * * *